(12) United States Patent
Gramss

(10) Patent No.: US 7,213,877 B2
(45) Date of Patent: May 8, 2007

(54) NECK REST FOR THE FRONT SEATS OF AUTOMOBILES

(75) Inventor: Rainer Gramss, Iserlohn (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 1 day.

(21) Appl. No.: 11/086,329

(22) Filed: Mar. 23, 2005

(65) Prior Publication Data

US 2005/0218708 A1    Oct. 6, 2005

(30) Foreign Application Priority Data

Apr. 2, 2004    (DE) .................... 10 2004 016 255

(51) Int. Cl.
*A47C 7/62* (2006.01)

(52) U.S. Cl. .................... 297/188.03; 297/188.04; 297/188.01

(58) Field of Classification Search .......... 297/188.03, 297/188.04, 188.07, 188.01, 146
See application file for complete search history.

(56) References Cited

U.S. PATENT DOCUMENTS

| | | | | |
|---|---|---|---|---|
| 2,320,215 A | * | 5/1943 | Brenner | 297/188.03 |
| 2,383,125 A | * | 8/1945 | Hill | 297/146 |
| 2,951,531 A | * | 9/1960 | Dantes | 297/182 |
| 3,615,118 A | * | 10/1971 | Buxton | 297/188.07 |
| 4,702,519 A | * | 10/1987 | Lobanoff | 297/185 |
| 4,711,488 A | * | 12/1987 | Ohanessian | 297/188.03 |
| 4,792,183 A | * | 12/1988 | Townsend, III | 297/163 |
| 4,836,602 A | * | 6/1989 | d'Almada Remedios et al. | 297/188.06 |
| 5,139,310 A | * | 8/1992 | Itoh | 297/391 |
| 6,443,523 B1 | * | 9/2002 | Reitze | 297/188.03 |
| 2003/0184134 A1 | * | 10/2003 | Liu | 297/188.03 |

FOREIGN PATENT DOCUMENTS

| | | |
|---|---|---|
| DE | 199 09 879 | 9/1999 |
| DE | 19909879 A1 | 9/1999 |
| DE | 20301090 U1 | 5/2003 |
| EP | 0753427 A2 | 1/1997 |
| FR | 2380161 A | 9/1978 |
| FR | 2773121 A1 | 7/1999 |
| JP | 2002144966 A | 5/2002 |
| WO | 97/03864 A | 2/1997 |

OTHER PUBLICATIONS

See search report issued on Jan. 16, 2007 in corresponding foreign application.

* cited by examiner

*Primary Examiner*—David R. Dunn
*Assistant Examiner*—Sarah B. McPartlin
(74) *Attorney, Agent, or Firm*—Lowe Hauptman & Berner, LLP

(57) ABSTRACT

A neck rest for the front seats in automobiles, a neck rest body being supported by the back rest of the front seats, characterized in that a support member being integrated in the backside of the neck rest body, the support member being movable in the neck rest body between a closed and an opened position, in the closed position the support member being substantially flush with the backside of the neck rest body and the support member having means for supporting or suspending an article at the backside of the neck rest body in the opened position of the support member.

14 Claims, 3 Drawing Sheets

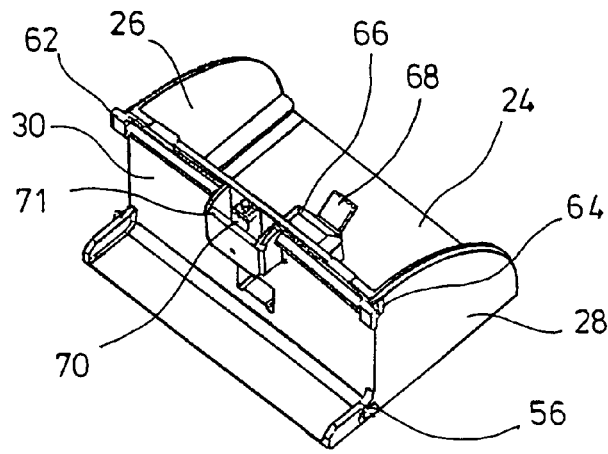
FIG.7
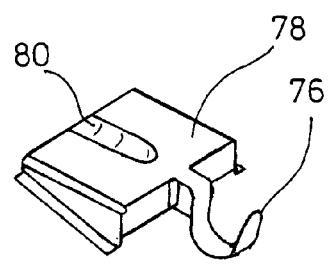
FIG.8
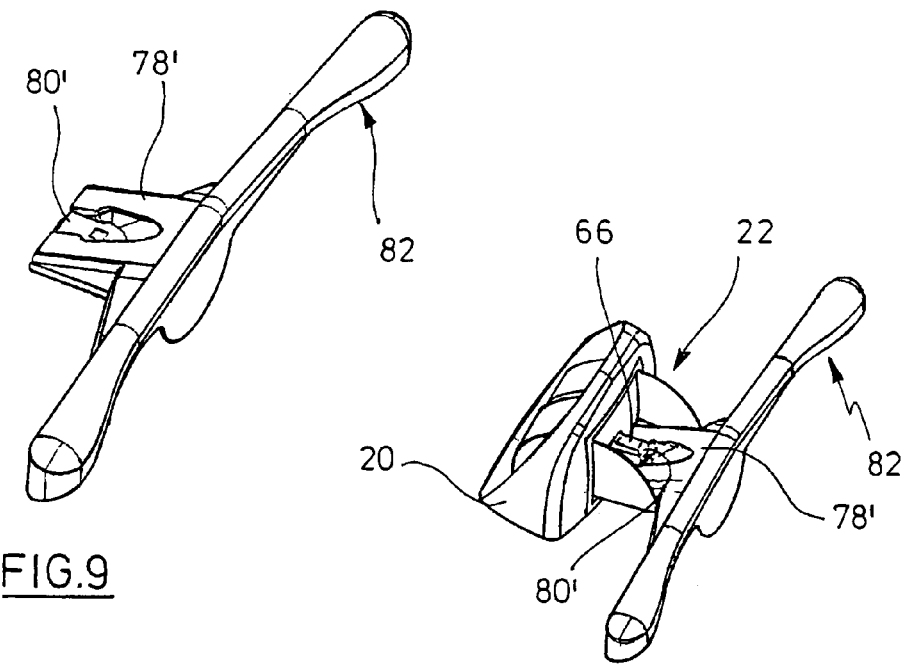
FIG.9
FIG.10

NECK REST FOR THE FRONT SEATS OF AUTOMOBILES

RELATED APPLICATIONS

The present application is based on, and claims priority from, German Application Number 10 2004 016 255.7, filed Apr. 2, 2004, the disclosure of which is hereby incorporated by reference herein in its entirety.

FIELD OF THE INVENTION

The invention relates to a neck rest for the front seats of automobiles according to the preamble of claim 1.

BACKGROUND OF THE INVENTION

For safety reasons, the seats of automobiles have neck rests in which a neck rest body is fixably supported in the seat back, mostly by means of a pair of bars, so as to be adjustable in height. It is further known to make such neck rests pivotable about a horizontal axis also with respect to the neck rest bars.

Automobile users frequently feel a need to suspend objects in the automobile, e.g. clothing, clothes bags, and the like. It is known to attach hooks to the grab handles mounted on the roof on which objects can be suspended. It is further known to slide accessory items onto the bars of the neck rests in order to suspend anything thereon.

SUMMARY OF THE INVENTION

It is the object of the invention to provide a neck rest for the front seats of automobiles that can be used as a holder for objects.

According to the invention, the object is achieved by the features of claim 1.

In the invention, a support member is integrated in the backside of the neck rest body that is movable between a closed and an opened position in the neck rest body. In the closed position, the support member is substantially flush with the backside of the neck rest body so that the body has or maintains an optically attractive appearance. In the opened position of the support member, the member backside is accessible from outside. It is provided with means for supporting or suspending an object on the backside of the neck rest body. A bag, an article of clothing, a coat-hanger or the like which can be suspended on the support member may then hang down in an easy manner in the space between the backside of the front seat and the front side of the rear seat.

According to an aspect of the invention, the support member is a flap pivotally supported about a horizontal axis which extends substantially horizontally when in the opened position. According to an aspect of the invention, the flap can be retained in the closed position by means of a locking device. The locking device can be designed according to the push-push principle such that pressure exerted against the closed flap causes the support member to be unlocked and, vice versa, the flap will be locked automatically when the support member is pivoted from the opened to the closed position. Alternatively, unlocking can be performed by an actuation element at the backside of the flap or support member or at the backside of the neck rest body.

Preferably, the support member is biased to the opened position by a spring and a dampening element is adapted to interact with the support member to slow down the movement to the opened position.

Since significant forces will possibly act upon the support member a further aspect of the invention provides that the support member and neck rest body have cooperating retaining means which hold the support member in the opened position. Retaining elements can be provided on the two sides of the support member, e.g. in the form of a rope or the like.

As was mentioned already, means are provided at the inside of the support member which make it possible to mount an element to be supported or suspended. In this conjunction, an aspect provides that mounting means are arranged at the inside of the support member to releasably mount a separate means for supporting or suspending objects. To this end, the support member may provide for a plug-in means thereon into which the supporting or suspending means can be slid.

Alternatively, in lieu of a releasable suspension or supporting means, a provision can be made for the suspension or supporting means to be adjustably supported at the backside of the support member such that if the support member is in the opened position the suspension or supporting means can be displaced partially beyond the outer edge of the support member. For example, if a hook is provided on the suspension or supporting means such hook can become exposed when the means is displaced beyond the edge of the support member, thereby enabling an object to be suspended on the hook. However, it is also conceivable to provide other suspension or supporting means, e.g. a specific coat-hanger, which can be releasably joined to the mounting means in the support member.

Various constructional versions are possible to realize the means described. According to the invention, one is to provide the flap with vertical lateral portions at the backside, embed a casing with a backwardly directed opening into the neck rest body with the casing having a bottom and side walls. The side walls and lateral portions can jointly define pivoting journals for the flap and guide means through which the flap is passed during a displacement and which limit the displacement of the flap can be provided between the side walls and lateral portions. The casing is inserted into an appropriate recess at the backside of the neck rest body and the casing can be provided with catch portions which interengage with matching catch portions in the neck rest body in order to locate the casing in the neck rest body. It is understood that the casing will occupy one some fraction of the volume of the neck rest body, thus leaving sufficient space for an appropriate cushion as is common for neck rests.

The side walls of the casing can be equipped with arcuate guide slots which are engaged by a projection each of the lateral portions of the flap.

BRIEF DESCRIPTION OF THE DRAWING

The invention will be described in more detail below with reference to an embodiment shown in the drawings.

FIG. 7 shows the rear view of the support flap of FIG. 4.

FIG. 8 shows a plug-in member with a hook for the support flap of FIGS. 3 and 7.

FIG. 9 shows a plug-in member with a coat-hanger for the support flap of FIGS. 3 and 7.

FIG. 10 shows how to attach the member of FIG. 9 to a neck rest body.

DETAILED DESCRIPTION OF THE INVENTION

Figure 1:
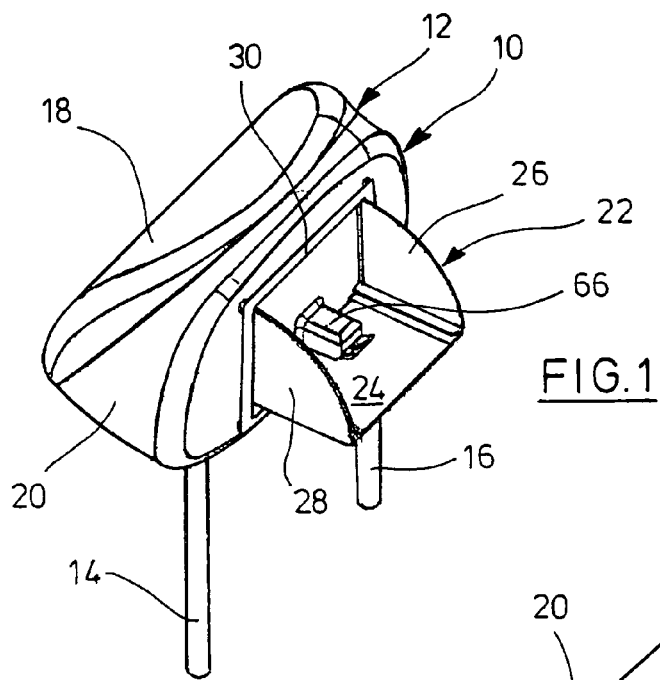
FIG. 1 shows a perspective view of the backside of an inventive neck rest with a support flap turned outwards.
Figure 2:
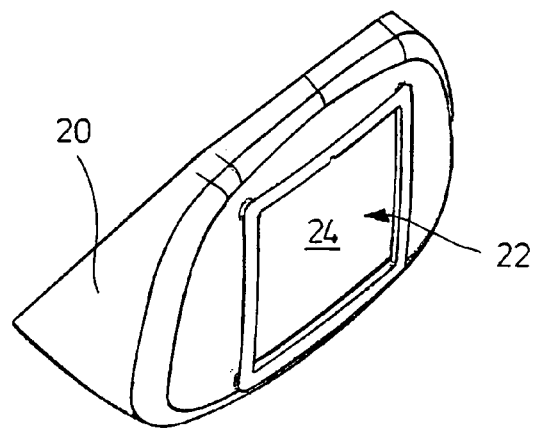
FIG. 2 shows a view similar to FIG. 1, but with the support flap turned inwards.

In FIG. 1, a neck rest 10 is shown with a neck rest body 12 on which two bars 14, 16 are mounted. The bars 14, 16 are accommodated in matching seats of a back rest (not shown) of a front seat of an automobile (not shown). The neck rest body 12 is broken down into a front cushion member 18 and a rear support member 20. Merely the support member 20 is shown in FIG. 2. As can be appreciated from FIGS. 1 and 2 the support member 20 of the neck rest body 12 has arranged therein a support flap 22 which is illustrated in the opened position in FIG. 1 and in the closed position in FIG. 2. The support flap 22 has a bottom 24 which extends to be substantially horizontal in the opened position, two lateral portions 26, 28, and a rear wall 30. In the closed position, the bottom 24 forms some portion of the backside of the support member 20 and finishes as being substantially flush with the backside of the support body 20.

Figure 3:
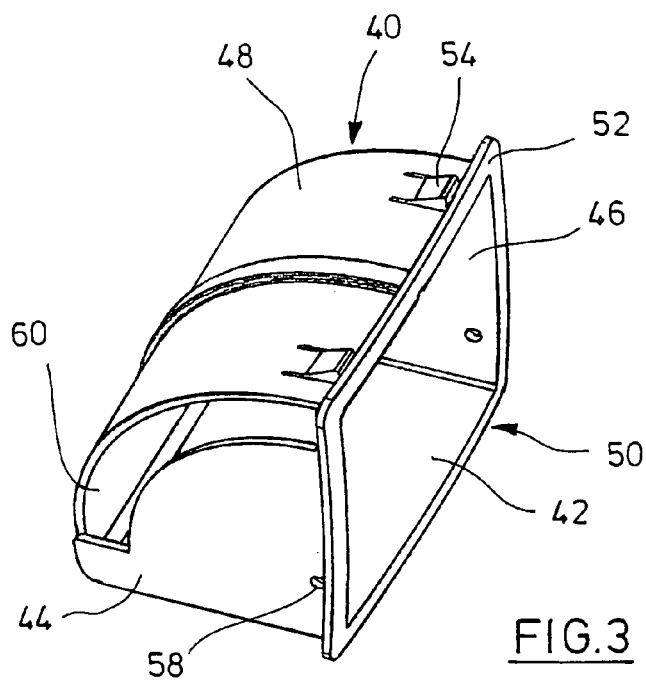
FIG. 3 shows a perspective view of a casing for the support flap of FIG. 1.
Figure 4:
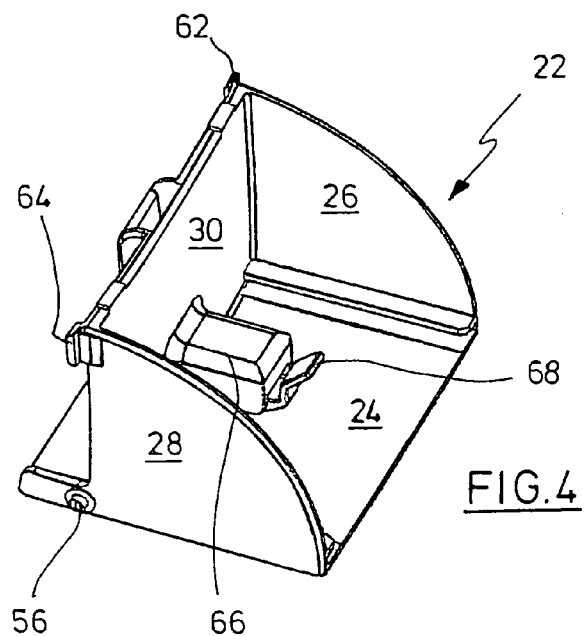
FIG. 4 shows a perspective enlarged view of the support flap of FIG. 1.
Figure 5:
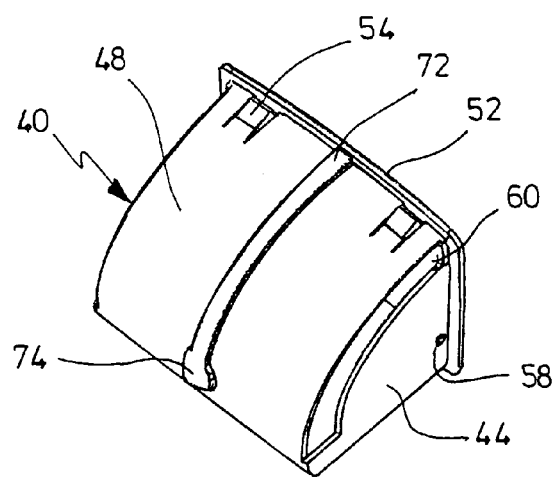
FIG. 5 shows the rear view of the casing of FIG. 3.
Figure 6:
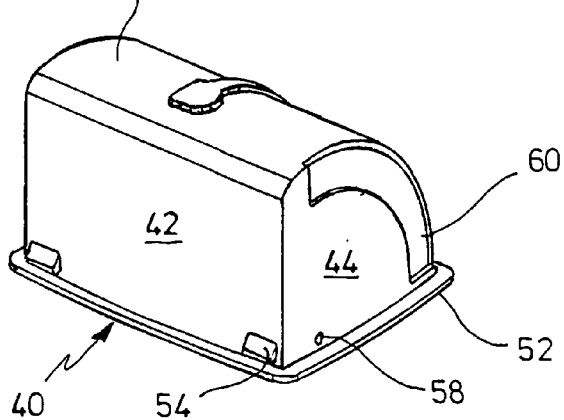
FIG. 6 shows a perspective bottom view of the casing of FIGS. 3 and 5.

In FIGS. 3, 5, and 6, a casing 40 is shown with a bottom 42, side walls 44, 46, and a ceiling and rear wall portion 48. The latter extends forwards up to the bottom 42 from a rectangular opening 50 in an arc shape. The opening 50 is defined by a rectangular frame 52. The casing shown in those Figures is introduced into a matching recess of the support member 20. For an attachment of the casing 40 inside the support member 20, detent protrusions 54 are provided at the upper surface and lower surface of the casing near the frame 52. The detent protrusions snap in behind appropriate edges in the recess (not shown) of the support member 20.

The support flap 22 is dimensioned such as to be insertable approximately fittingly in the casing 40. The outside of the lateral portions 26, 28 has provided thereon support protrusions 55 which interengage with support apertures 58 in the side walls 44, 46 of the casing 40 to allow the support flap 22 to be pivoted to an open position of FIG. 1 from a closed position of FIG. 2, and vice versa. Therefore, the lateral portions 26, 28 are situated very close to the inside of the side walls 44, 46 of the casing 40. The side walls 44, 46 have arcuate slots 60 which are engaged by lateral protrusions 62, 64 on the lateral portions 26, 28 at the level of the rear wall 30. This provides for a guide in pivoting the support flap 22 and a limitation in the end positions as are shown in FIGS. 1 and 2.

Formed to the rear wall 30 of the support flap 22 is a projection 66 which extends rearwards from the rear wall 30 approximately in parallel with the bottom 24 at a certain distance therefrom. A cranked leaf spring 68 is mounted at the underside of the projection 66.

It can be seen from FIG. 7 that a locking element 70 is supported in a casing portion 71 adjacent to the upper edge of the rear wall 30. The locking element projects slightly beyond the upper edge of the rear wall 30 and moves in an arcuate recess, which presents itself outwardly as a rib 72, and leaves it approximately in the middle of the wall 48 of the casing 40, the locking element 70 interacting lockingly with an extension of the recess (see rib portion 74) when the support flap 22 is pivoted to the closed position. The locking element 70 functions according to the push-push principle. An automatic locking action takes place when the support flap 22 is brought to the closed position. If a pressure is exerted against the backside 24 of the support flap 22 the locking element 70 is unlocked, which allows the support flap 22 to be pivoted outwardly. This pivoting action can be enhanced by a spring (not shown). Vice versa, the locking element 70 automatically locks the support flap 22 if the flap is pivoted back to its closed position.

In FIG. 8, a hook 76 is shown which is mounted on a wedge-shaped plug-in member 78. Both the hook 76 and plug-in member 78 can be formed integrally from a plastic. There is a detent recess 80 at the upper side of the plug-in member 78. The detent recess 80 can be placed under the projection 66, which causes the projection 66 to partially engage the recess 80 and the spring 68 to interact with a matching locking edge of the recess 80. The lower side of the plug-in member 78 rests on the bottom 24. In this position, the hook 76 is located outside the outer edge of on the bottom 24 so that an object can be suspended on the hook.

In FIG. 9, a coat-hanger 82 is illustrated which is formed integrally with a plug-in member 78' which is identical to the plug-in member 78 of FIG. 8. The recess 80' equals the recess 80 of FIG. 8. The plug-in member 78' can be pushed into the support flap 22 in the same ways as that of FIG. 8 and can be locked therein. This is shown in FIG. 10. The coat-hanger 82 is located outside the support flap 22 or its bottom 24 so that an article of clothing can be hung over the hanger 82.

All elements except for the spring 68 can be formed from a suitable plastic material. Both the support flap 22 and casing 40 can be manufactured as an integral part.

The invention claimed is:

1. A neck rest for the front seats in automobiles, comprising:
    a neck rest body, configured to be supported by a back rest of a front seat, the neck rest body including:
    a support member integrated in a backside of the neck rest body, the support member comprising a recess;
    a support flap, the support flap being movable in the recess between a closed and an opened position, the support flap comprising a bottom substantially flush with the backside of the neck rest body and in the open position, the bottom is extended substantially horizontal;
    a supporting or suspending element attached to an interior portion of the support flap, the supporting or suspending element configured to support or suspend an article at the backside of the neck rest body in the opened position of the support flap; and
    a housing adapted to be mounted in the neck rest body, the housing having a backwardly directed opening, a bottom and side walls;
    wherein the support flap is supported for rotation about a horizontal axis; and
    wherein the support flap has vertical lateral portions such that a journal is provided between the side walls and the lateral portions of the support flap; and
    wherein a guide element provided between the side walls and the lateral portions of the support flap is configured to guide the support flap during its displacement and limit the movement thereof.

2. The neck rest of claim 1, wherein the support flap is retained in the closed position by a locking element.

3. The neck rest of claim 2, wherein the locking element is designed along the push-push-principle such that upon a pressure against the backside of the support flap, the locking element is unlocked and the support flap is automatically locked when moved from the opened to the closed position.

4. The neck rest of claim 2, wherein at the backside of the neck rest body or of the support member an actuation element is provided that upon actuation, unlocks the locking element.

5. The neck rest according to claim 1, wherein the support flap is biased to the opened position by a spring element.

6. The neck rest of claim 1, wherein the support member and the neck rest body include cooperating retaining elements to guide the support flap when the support flap moves from the closed to opened position and vice versa.

7. The neck rest of claim 1, wherein the supporting or suspending element further comprises an accommodation element configured to receive a plug-in element, wherein the plug-in element is configured to support or suspend an article at the backside of the neck rest body in the opened position of the support flap.

8. The neck rest of claim 7, wherein the suspending or supporting element is releasably attachable or pluggable.

9. The neck rest of claim 7, wherein the suspending or supporting element includes a hook.

10. The neck rest of claim 7, wherein the suspending or supporting element includes a coat-hanger.

11. The neck rest of claim 7, wherein the supporting or suspending element is mounted to a front side of a rear wall of the support flap.

12. The neck rest of claim 1, wherein the suspending or supporting element is displaceably supported on the support member such that in the opened position of the support member the suspending or supporting element can be displaced partially beyond an outer edge of the support member.

13. The neck rest of claim 1, wherein the side walls have arcuate guide slots and the lateral portions of the support flap each have a projection which engages the associated guide slot.

14. The neck rest of claim 1, wherein the lateral portions of the support flap are interconnected by a transverse element or a rear wall portion, and a locking element is movably supported by the transverse element or the rear wall, the locking element cooperating with a locking recess in the rear wall of the housing.

* * * * *